(12) United States Patent
Wang

(10) Patent No.: US 11,572,091 B1
(45) Date of Patent: Feb. 7, 2023

(54) FOLDABLE WAGON

(71) Applicant: Sapphire premium (shenzhen) technology co., ltd, Shenzhen (CN)

(72) Inventor: Junqiao Wang, Shenzhen (CN)

(*) Notice: Subject to any disclaimer, the term of this patent is extended or adjusted under 35 U.S.C. 154(b) by 0 days.

(21) Appl. No.: 17/729,011

(22) Filed: Apr. 26, 2022

(51) Int. Cl.
*B62B 3/02* (2006.01)
*B62B 5/00* (2006.01)

(52) U.S. Cl.
CPC ............... *B62B 3/025* (2013.01); *B62B 5/00* (2013.01)

(58) Field of Classification Search
CPC ...... B62B 3/025; B62B 3/007; B62B 2205/06
See application file for complete search history.

(56) References Cited

U.S. PATENT DOCUMENTS

| | | | | |
|---|---|---|---|---|
| 10,099,712 | B1* | 10/2018 | Sun | B62B 5/067 |
| 10,435,055 | B1* | 10/2019 | Zhu | B62B 3/007 |
| 10,501,103 | B1* | 12/2019 | Wang | B62B 3/025 |
| 10,633,010 | B1* | 4/2020 | Zhang | B62B 3/025 |
| 10,953,903 | B1* | 3/2021 | Park | B62B 3/007 |
| 10,988,153 | B1* | 4/2021 | Horowitz | B62B 7/008 |
| 11,225,277 | B1* | 1/2022 | Sun | B62B 5/061 |
| 11,285,983 | B1* | 3/2022 | Horowitz | B62B 3/02 |
| 2018/0297622 | A1* | 10/2018 | Chen | B62B 3/007 |
| 2018/0327011 | A1* | 11/2018 | Horowitz | B62B 5/067 |
| 2020/0031376 | A1* | 1/2020 | Horowitz | B62B 3/025 |
| 2020/0207392 | A1* | 7/2020 | Wang | B62B 3/001 |
| 2021/0061332 | A1* | 3/2021 | Sturgeon | B62B 5/061 |
| 2021/0107548 | A1* | 4/2021 | Wang | B62B 3/007 |
| 2021/0107549 | A1* | 4/2021 | Wang | B62B 3/007 |
| 2021/0114643 | A1* | 4/2021 | Sun | B62B 5/067 |
| 2021/0284216 | A1* | 9/2021 | Sun | B62B 5/067 |
| 2021/0291886 | A1* | 9/2021 | Zehfuss | B62B 9/142 |
| 2021/0300450 | A1* | 9/2021 | Yang | B62B 5/067 |
| 2022/0041199 | A1* | 2/2022 | Tong | B62B 3/025 |
| 2022/0089207 | A1* | 3/2022 | Gavin | B62B 3/025 |

FOREIGN PATENT DOCUMENTS

| CN | 205059673 U | * | 3/2016 | |
|---|---|---|---|---|
| CN | 211710882 U | * | 10/2020 | B62B 3/002 |

* cited by examiner

*Primary Examiner* — Katy M Ebner
(74) *Attorney, Agent, or Firm* — Rumit Ranjit Kanakia

(57) ABSTRACT

A foldable wagon comprises a foldable frame, a pull rod assembly installed at the front of the foldable frame, and walking wheels installed at the bottom of the foldable frame, wherein the foldable frame comprises an underframe, a front frame arranged at the front of the underframe, a rear frame arranged at the rear of the underframe, and side frames arranged at the left and right sides of the underframe; and the underframe is connected with the front frame, the rear frame, and the side frames through a lower connecting seat, a supporting rod, and an upper connecting seat to form a foldable frame structure; the underframe comprises a bottom beam and side rods arranged at the front and rear sides of the bottom beam in a crossed manner, which form a stable triangular support structure in a crossed manner; the structural strength of the bottom is high, and the bottom beam comprises a fastening member. The fastening member is connected with the overlapping joint of two inner long rods of the inner rod of the side frame by a bolt penetrating way, which realizes the interconnection between the underframe and the side frame and further increases the overall strength of the foldable frame.

16 Claims, 18 Drawing Sheets

FOLDABLE WAGON

TECHNICAL FIELD

The present invention relates to a foldable wagon.

BACKGROUND

The foldable wagon is loved by consumers because of its characteristics of foldability and being easy to carry and store. However, the structural strength of the foldable wagon is not as good as that of the rigid wagon. Therefore, it is of great significance to improve the structural strength and bearing capacity of the foldable wagon so as to ensure the use needs of consumers to the greatest extent. The existing foldable wagon's underframe structure is relatively simple. Generally, only four underframe pipes form a rotatable structure, and there is no corresponding structural connection between the underframe and the side frame, so the overall structural strength and stability of the foldable wagon are poor.

SUMMARY

In view of the shortcomings of the above problems, the present invention provides a foldable wagon.

In order to achieve the above object, on the one hand, the present invention provides a foldable wagon, which comprises a foldable frame and at least one traveling wheel installed at the bottom of the foldable frame, wherein the foldable frame comprises an underframe, a front frame arranged at the front part of the underframe, a rear frame arranged at the rear part of the underframe, and side frames arranged at the left and right sides of the underframe; the underframe is connected with the front frame, the rear frame and the side frame through a lower connecting seat, a supporting rod and an upper connecting seat to form a foldable frame structure, characterized in that the underframe comprises side rods, hinges and connectors, wherein the side rods are arranged in pairs, and one end of the side rod is provided with a rotatable connector; the connector is rotatably connected to the lower connecting seat, and the other end of the side rod is rotatably connected to a blade at one side of the hinge, and the blades on both sides of the hinge can be turned down and closed by rotation.

As a further improvement of the solution, a pull rod assembly is arranged at the front of the foldable frame, and the pull rod assembly comprises side pull rods rotatably arranged on the two lower connecting seats at the front side, a pull rod fixing block connected to the free ends of the two side pull rods, and a middle pull rod movably and adjustably penetrates through the pull rod fixing block.

As a further improvement of the solution, the rear frame comprises two crossed rear frame rods, which are divided into two parts: a short rear frame rod and a long rear frame rod which are connected in a stacked manner; an upper end of the short rear frame rod is hinged on the upper connecting seat, a lower end of the long rear frame rod is hinged on the lower connecting seat, and the structure and connection mode of the front frame and the rear frame are the same.

As a further improvement of the solution, the side frame comprises two side frame outer rods and two side frame inner rods; one ends of the two side frame outer rods form a rotating structure by overlapping and connecting, and the other ends of the outer rods of the two side frames are hinged on the lower connecting seat; the side frame inner rod is divided into two parts: an inner long rod and an inner short rod which are connected in a stacked manner; the two inner long rods form a rotating structure by overlapping and connecting, and the two inner short rods are hinged on the upper connecting seat.

As a further improvement of the solution, the walking wheel is divided into a front wheel assembly and a rear wheel assembly, wherein the front wheel assembly comprises a front wheel, a bearing and a bearing cover, and an outer ring of the bearing is tightly fitted with a mounting ring of the lower connecting seat on the front side and locked by the bearing cover; a circular axle of the front wheel passes through the bearing cover and the bearing, and the circular axle is tightly fitted with an inner ring of the bearing, and an outer side of the mounting ring is provided with an integrally formed buckle, and the bearing cover is provided with a clamping groove corresponding to the buckle.

As a further improvement of the solution, the circular axle extends upwards to the inside of the supporting rod, and a free end of the circular axle is provided with an annular groove, and the supporting rod is internally provided with a pressing assembly at a height position corresponding to the annular groove; the pressing assembly comprises a button and a spring, the head of the button is a pressing part extending out of the supporting rod, the spring is connected to the tail of the button; a through hole is processed on a main body of the button, the through hole is divided into a penetrating area and a locking area, wherein the penetrating area is used for the circular axle to penetrate, and the locking area interacts with the annular groove to realize position locking.

As a further improvement of the solution, the rear wheel assembly comprises a rear wheel, a square axle of the rear wheel penetrates into the inside of the supporting rod, and a free end of the square axle is provided with a square groove, and the inside of the supporting rod is connected with the square groove, a pressing assembly is arranged in the supporting rod at the height position corresponding to the square groove, and the square axle is locked by the pressing assembly.

As a further improvement of the solution, a cloth cover is arranged outside the foldable frame, and the cloth cover is detachably connected with the foldable frame through a hook and loop.

To achieve: the above object, on the other hand, the present invention provides a foldable wagon, comprising a foldable frame, and at least one traveling wheel installed at the bottom of the foldable frame, wherein the foldable frame comprises an underframe, a front frame arranged at the front of the underframe, a rear frame arranged at the rear of the underframe, and two wheels arranged at the left and right sides of the underframe; the bottom frame is connected with the front frame, the rear frame and the side frame through a lower connecting seat, a supporting rod and an upper connecting seat to form a foldable frame structure; the side frame comprises two side frame outer rods and two side frame inner rods, one ends of the two side frame outer rods form a rotating structure by overlapping and connecting, the other ends of the two side frame outer rods are hinged on the lower connecting seat, the side frame inner rod is divided into two parts: an inner long rod and an inner short rod which are connected in a stacked manner; the two inner long rods form a rotating structure by overlapping and connecting, and the two inner short rods are hinged on the upper connecting seat, characterized in that the underframe comprises side rods, hinges and connectors, wherein the side rods are arranged in pairs, one end of the side rod is provided with a rotatable connector, and the connector is rotatably connected to the lower connecting seat; the other end of the side rod is rotatably connected to a blade at one side of the hinge, and the blades on both sides of the hinge can be turned down and closed by rotation; the underframe further comprises a bottom beam located below the hinge, the bottom beam comprises a connector located in the middle and beams rotatably connected to both sides of the connector: a free end of the beam is provided with a fastening member, and the fastening member is positioned and installed at the overlapping joint of the two inner long rods in a bolt penetrating manner.

In order to increase the connection strength between the foldable frame and the walking wheels, the present invention provides a foldable wagon, comprising a foldable frame and at least one traveling wheel installed at the bottom of the foldable frame, wherein the foldable frame comprises an underframe, a front frame arranged at the front of the underframe, a rear frame arranged at the rear of the underframe, and side frames on the left and right sides of the bottom frame; the underframe is connected with the front frame, the rear frame and the side frame through a lower connecting seat, a supporting rod and an upper connecting seat to form a foldable frame structure, characterized in that the walking wheel is divided into a front wheel assembly and a rear wheel assembly, and the front wheel assembly comprises a front wheel, a bearing and a bearing cover, and an outer ring of the bearing is tightly fitted with a mounting ring of the lower connecting seat on the front side; a circular axle of the front wheel is tightly fitted with the inner ring of the bearing, and the circular axle extends upwards to the inside of the supporting rod, and a free end of the circular axle is provided with an annular groove, a pressing assembly is arranged in the supporting rod at the height position corresponding to the annular groove; the pressing assembly comprises a button and a spring, the head of the button is a pressing part extending out of the supporting rod, the spring is connected to the tail of the button, the button is matched with the annular groove and the circular axle is clamped or released by pressing movement.

Compared with the prior art, the present invention has the beneficial effects that: 1, the underframe comprises a bottom beam and side rods arranged at the front and back sides of the bottom beam in a crossed manner, so that a stable triangular support structure is formed, and the bottom beam comprises a fastening member, and the fastening member is connected with the overlapping joints of two inner long rods of the inner rods of the side frame by a bolt penetrating way, so that the mutual connection between the underframe and the side frame is realized, and the overall strength of the foldable frame is further increased; 2. the circular axle of the front wheel and the square axle of the rear wheel all extend into the inside of the supporting rod and are connected by the pressing assembly, thus realizing the interconnection of the front wheel assembly, the rear wheel assembly and the supporting rod, and further strengthening the local connection strength at the lower connecting seat.

BRIEF DESCRIPTION OF DRAWINGS

FIG. 3-1 is a perspective view of the bottom frame part of the foldable frame (with a bottom beam);

FIG. 3-2 is a perspective view of the bottom frame part of the foldable frame (with a bottom beam);

FIG. 4-1 is a perspective view of the bottom frame part of the foldable frame (without a bottom beam);

FIG. 4-2 is a perspective view of the bottom frame part of the foldable frame (without a bottom beam);

In the figures: 1. Pull rod assembly; 11. Side pull rod; 12. Pull rod fixing block; 13. Middle pull rod; 2. Front frame; 3. Upper connecting seat; 4. Supporting rod; 5. Side frame; 51. Side frame outer rod; 52. Side frame inner rod; 521. Inner long rod; 522. Inner short rod; 6. Rear frame; 61. Rear frame rod; 611. Short rear frame rod; 612. Long rear frame rod; 7. Lower connecting seat; 71. Mounting ring; 8. Walking wheel; 81. Front wheel; 811. Circular axle; 8111. Annular groove; 82. Bearing cover; 83. Bearings; 84. Pressing assembly; 841. Button; 8411. Pressing part; 8412. Penetrating area; 8413. Locking area; 842. Spring; 85. Rear wheel; 851. Square axle; 8511. Square groove; 9. Underframe; 91. Bottom beam; 911. Connecting member; 912. Beam; 913. Fastening member; 92. Hinge; 921. Blade; 93. Side rod; 94. Connector.

DESCRIPTION OF EMBODIMENTS

Figure 1:
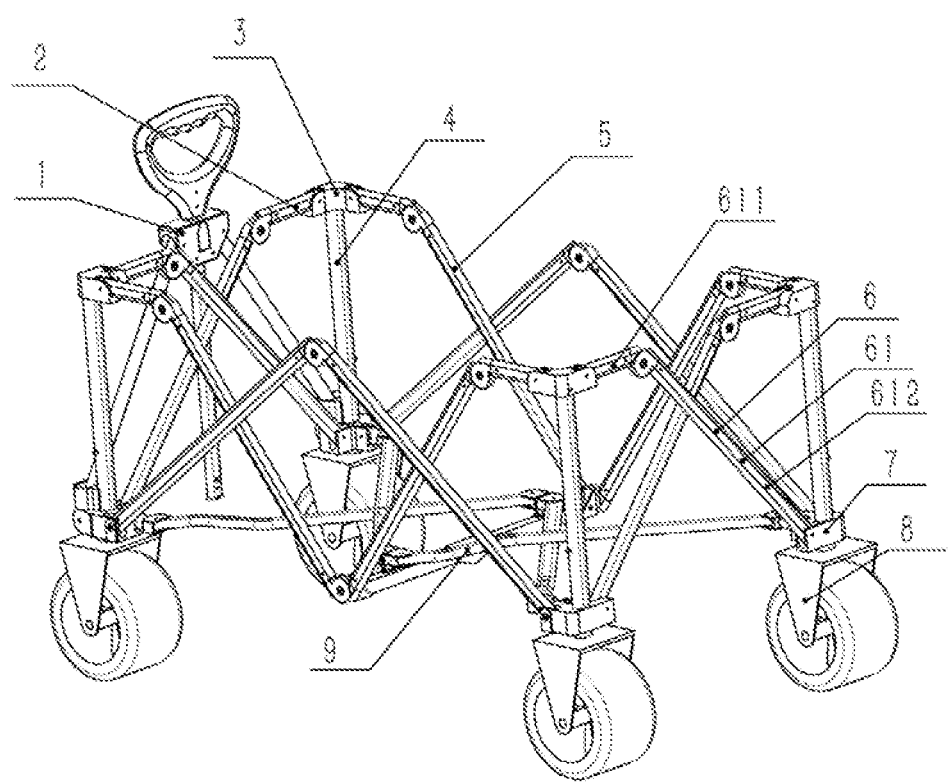
FIG. 1 is a perspective view of a foldable wagon according to the present invention.
Figure 2:
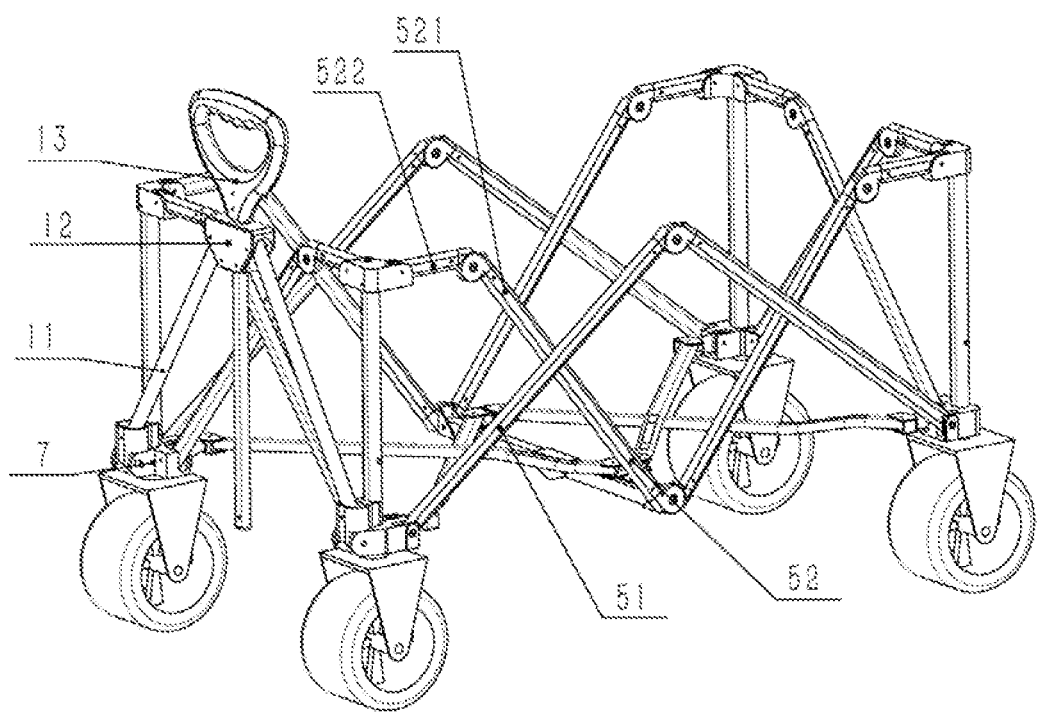
FIG. 2 is a perspective view of a foldable wagon according to the present invention.
Figures 1, 3:
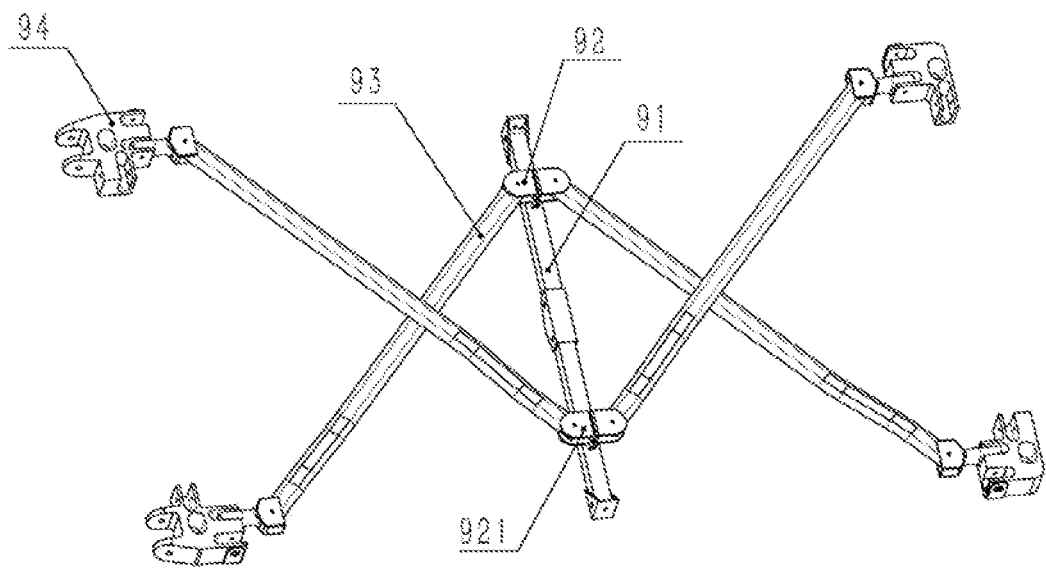
Figures 2, 3:
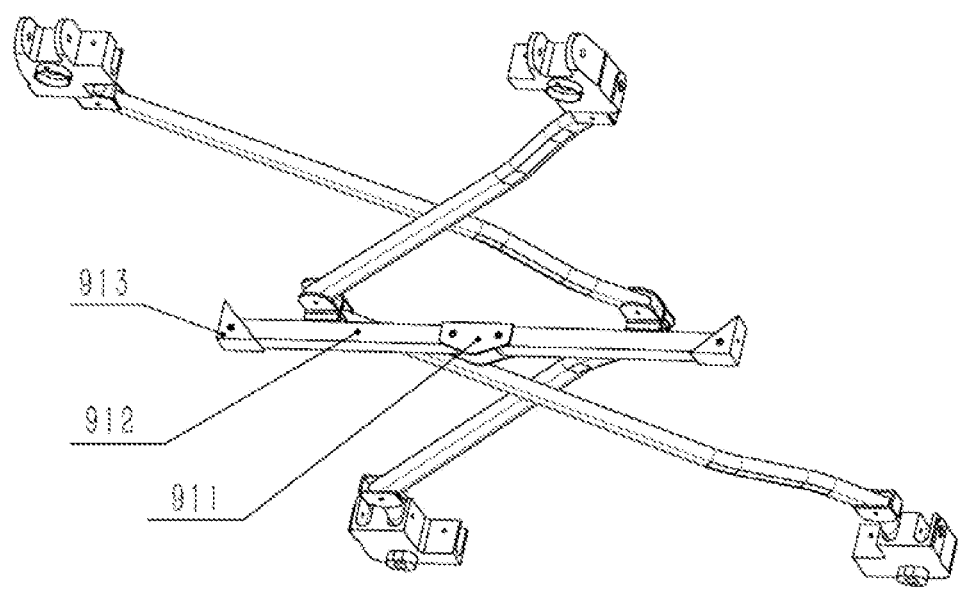
Figures 1, 4:
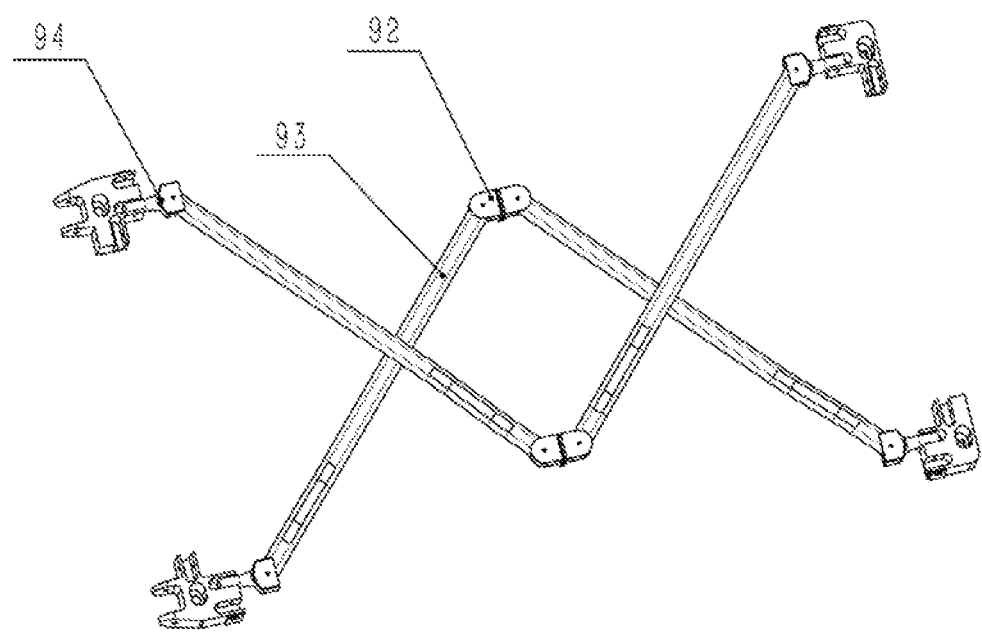
Figures 2, 4:
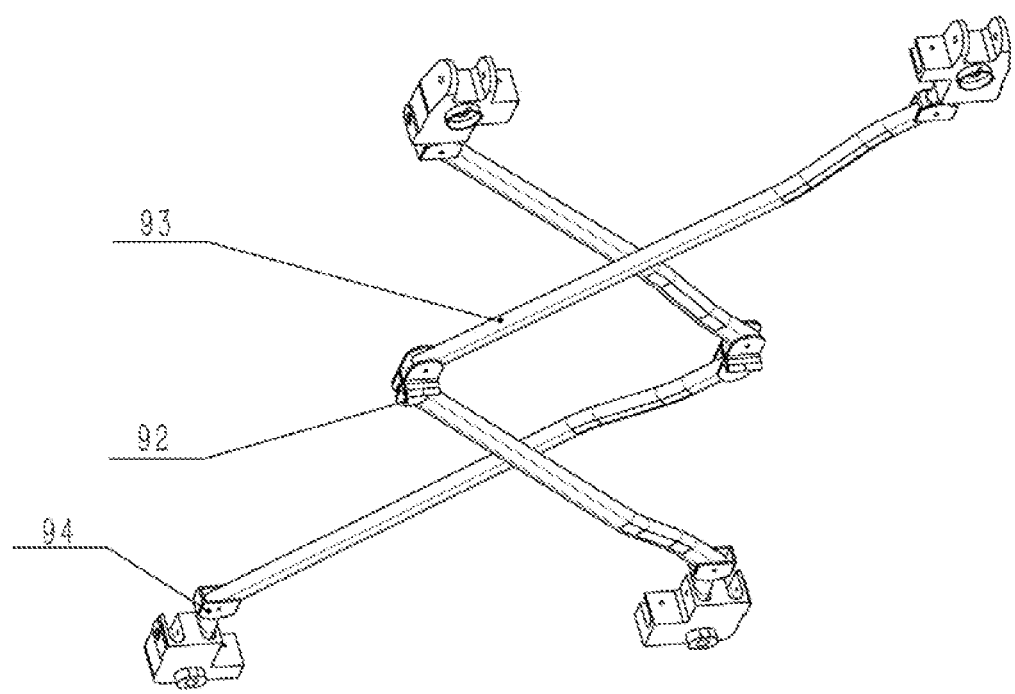
Figure 5:
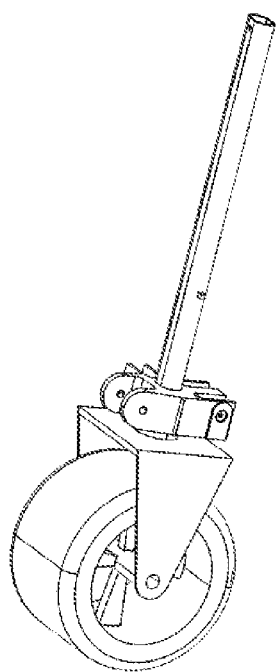
FIG. 5 is a perspective view of the front wheel assembly.
Figure 6:
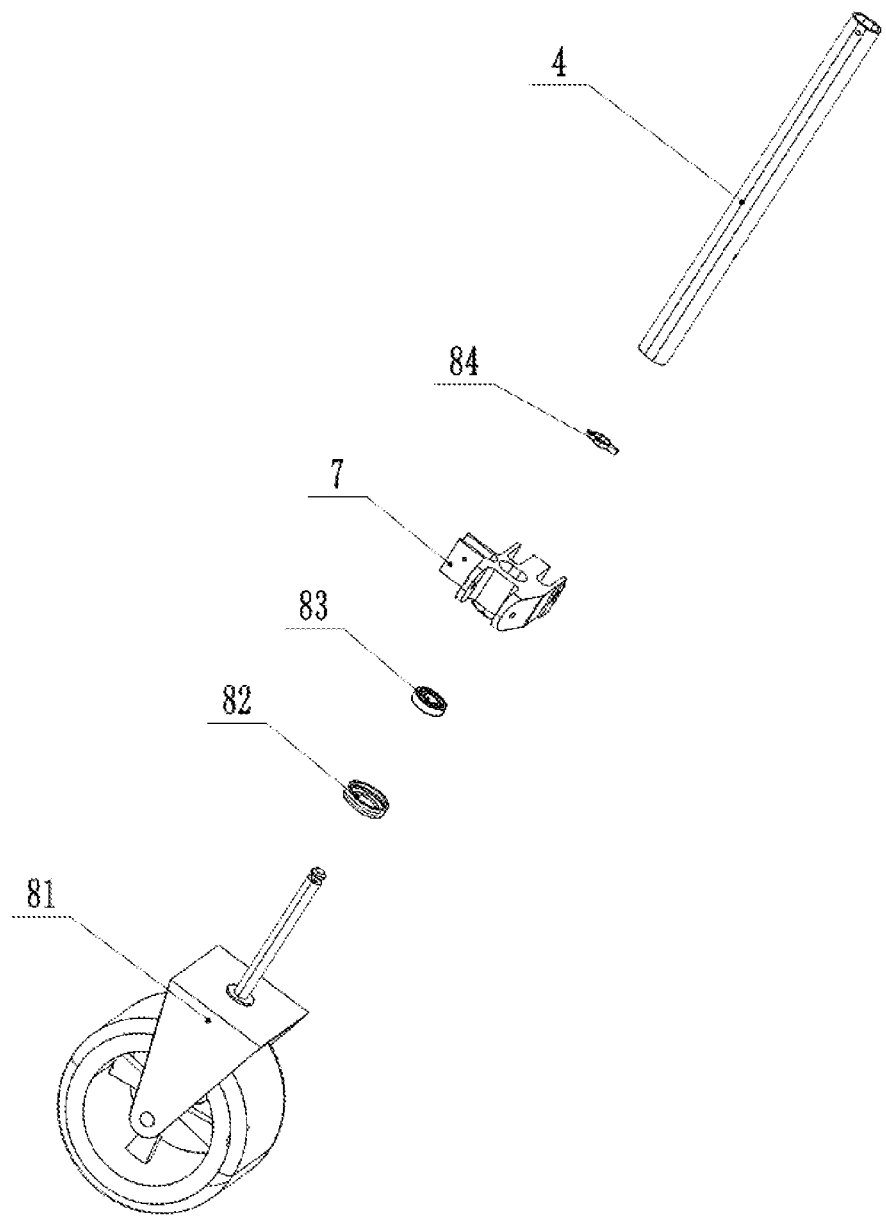
FIG. 6 is an exploded view of the front wheel assembly.
Figure 7:
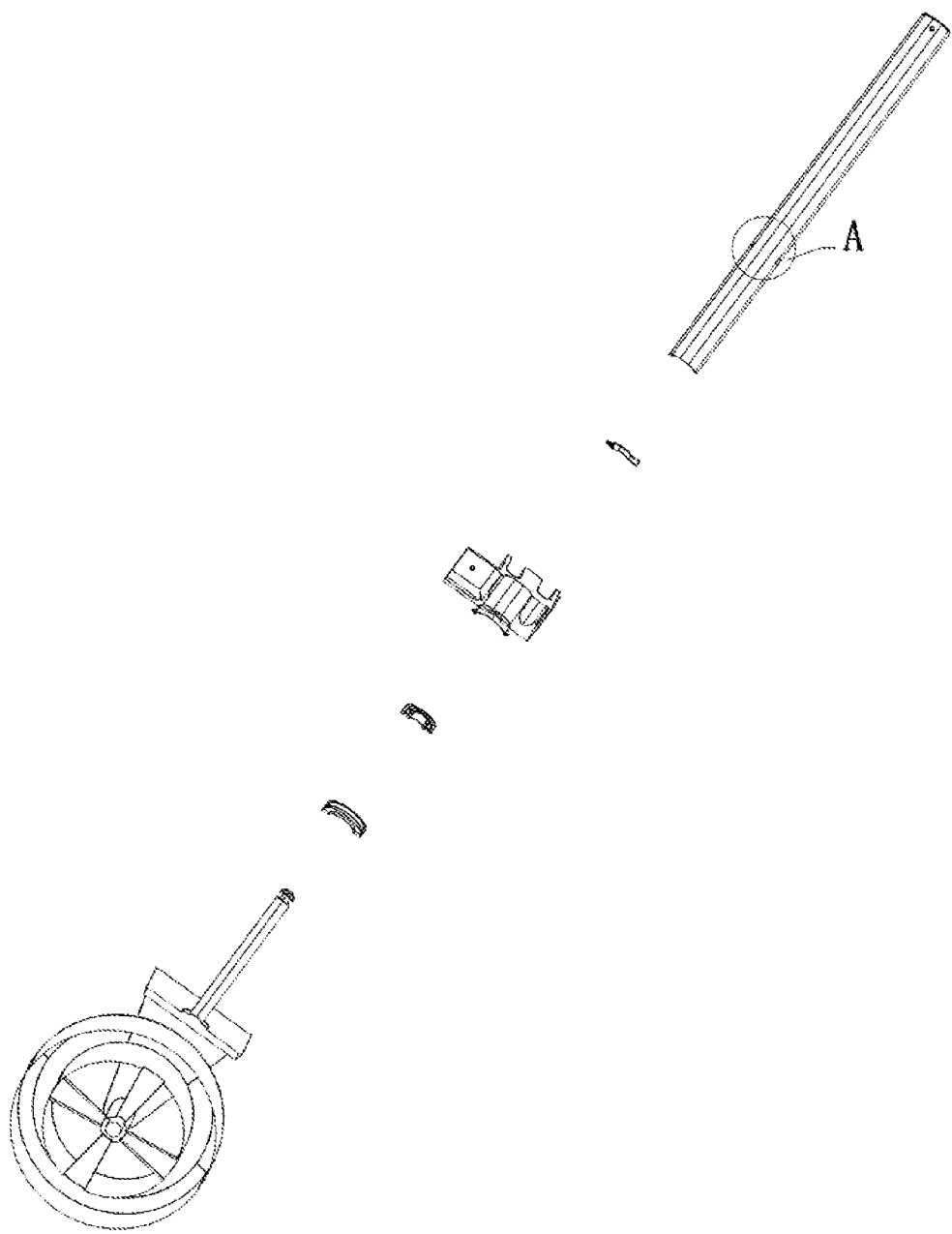
FIG. 7 is a sectional view of FIG. 6.
Figure 8:
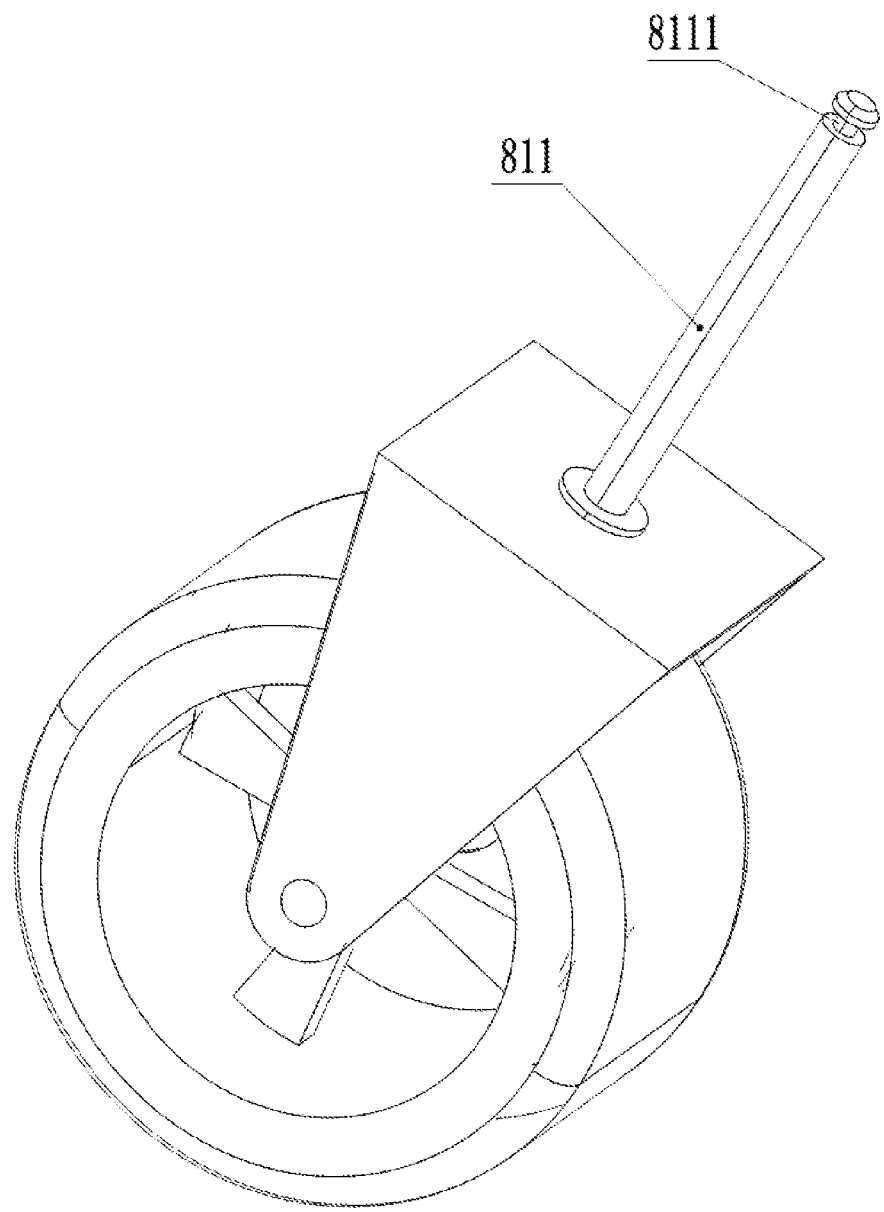
FIG. 8 is an enlarged view of the front wheel in FIG. 6.
Figure 9:
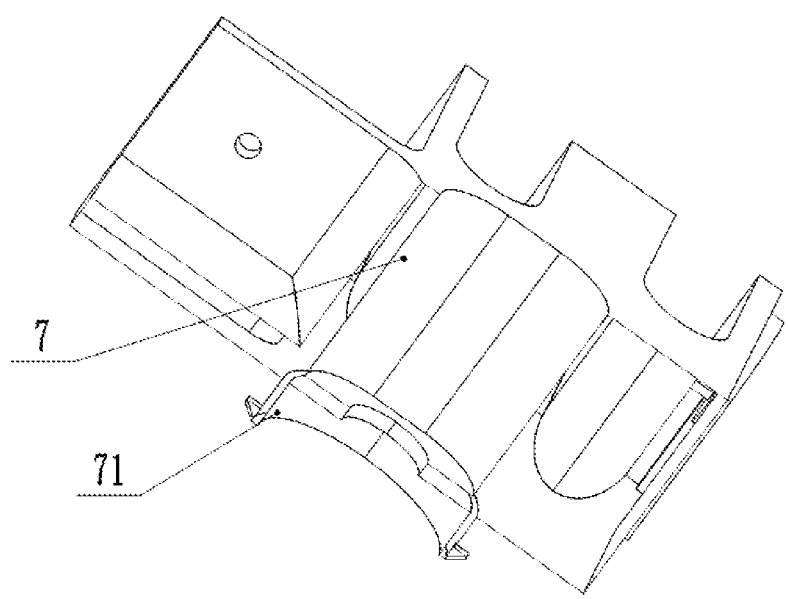
FIG. 9 is an enlarged view of the lower connecting seat in FIG. 7.
Figure 10:
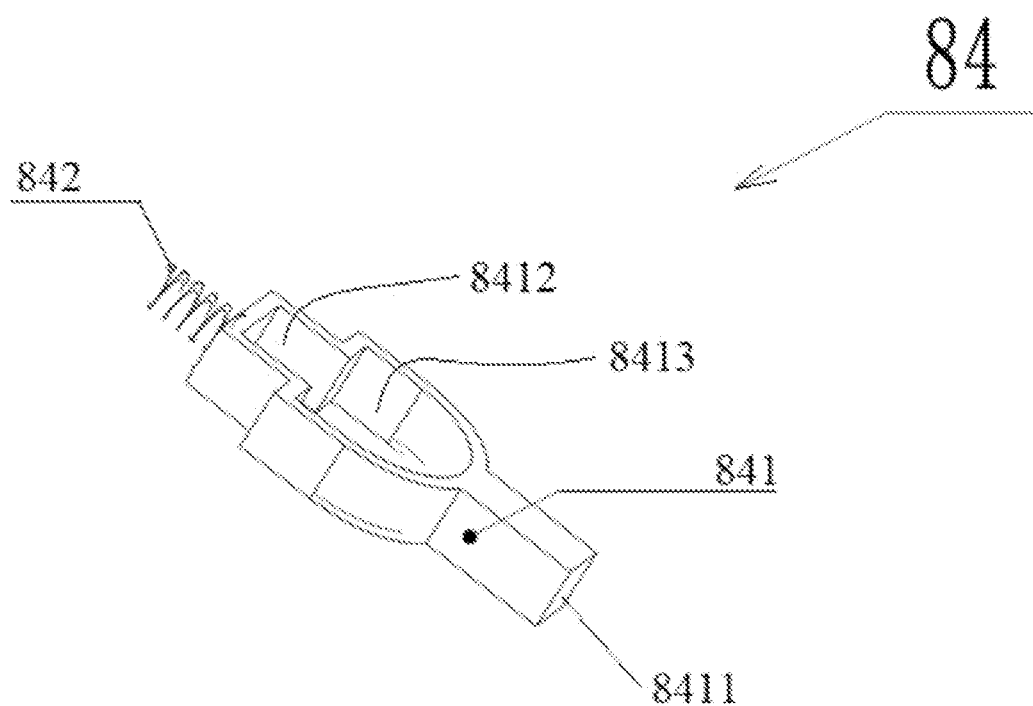
FIG. 10 is an enlarged view of the pressing assembly.
Figure 11:
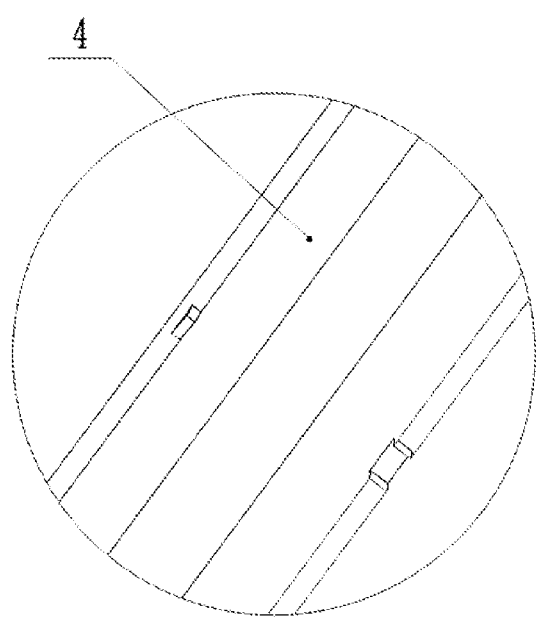
FIG. 11 is an enlarged view of position a in FIG. 7.
Figure 12:
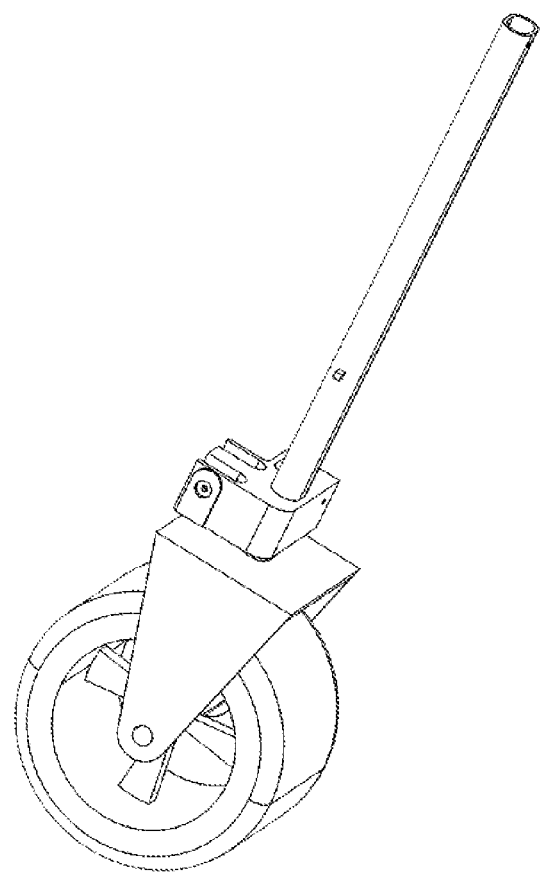
FIG. 12 is an enlarged view of the rear wheel assembly.
Figure 13:
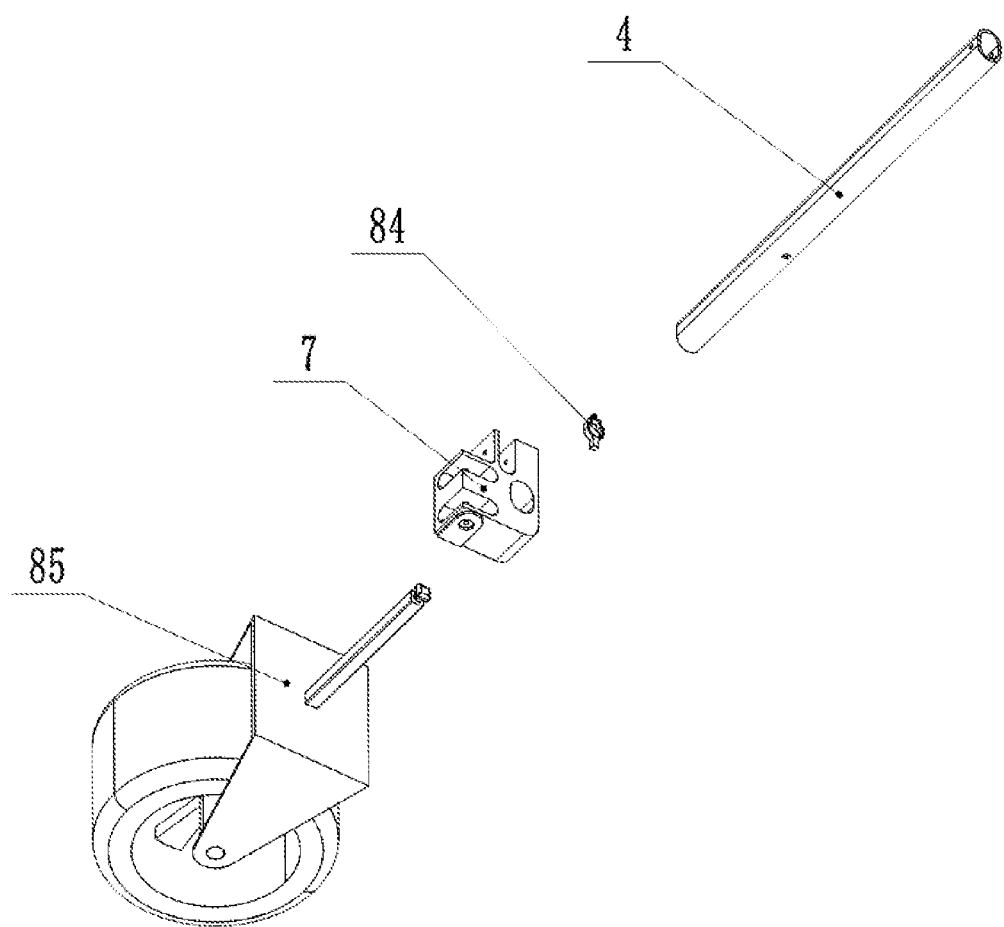
FIG. 13 is an exploded view of the rear wheel assembly.
Figure 14:
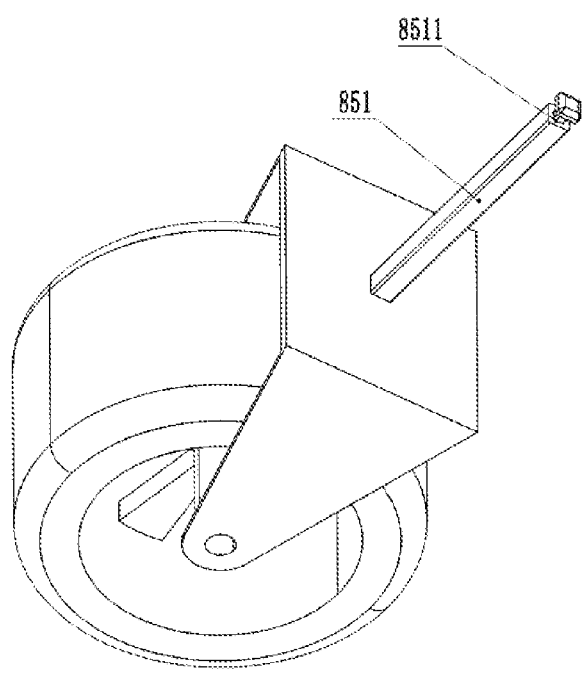
FIG. 14 is an enlarged view of the rear wheel in FIG. 13.
Figure 15:
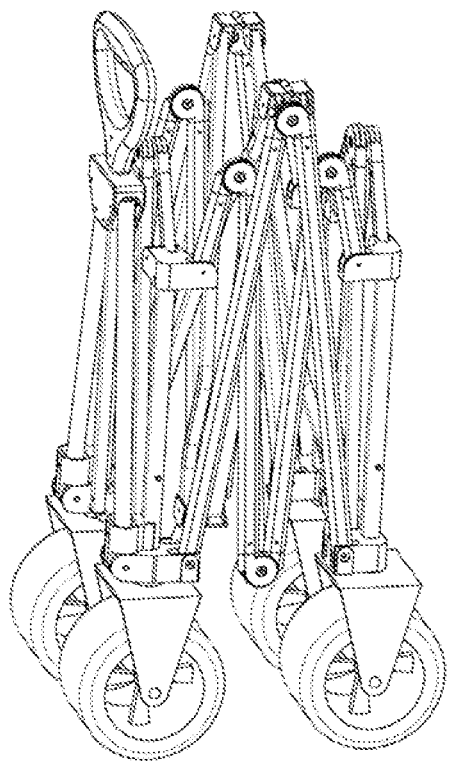
FIG. 15 is a schematic diagram of folding and folding a foldable wagon according to the present invention.
Figure 16:
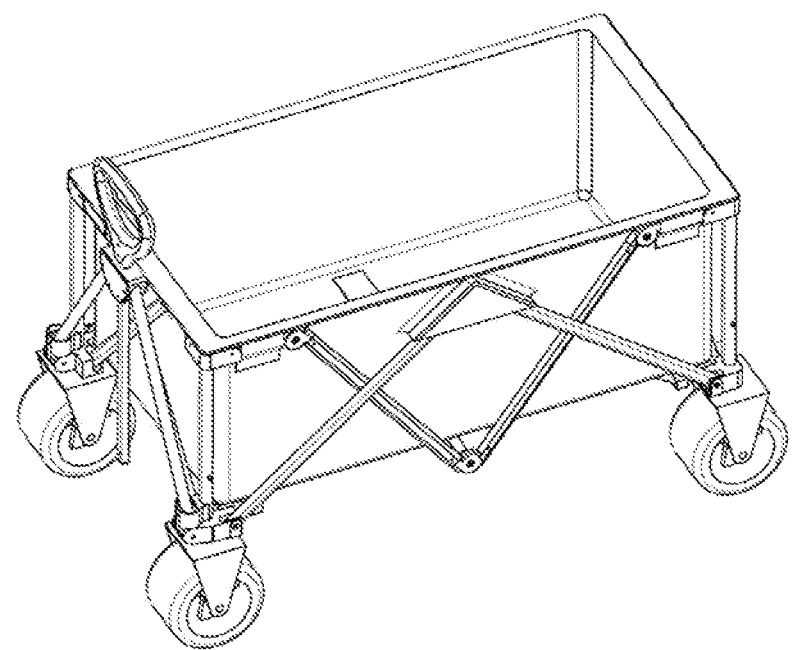
FIG. 16 is a schematic diagram of a foldable wagon with cloth cover according to the present invention.

As shown in FIGS. 1-16, a foldable wagon according to the embodiment of the present invention includes a foldable frame, a pull rod assembly 1 installed in front of the foldable frame, and at least one traveling wheel 8 installed at the bottom of the foldable frame. A cloth cover can be arranged on the outer side of the foldable frame by means of hook and loop (as shown in FIG. 16). The foldable frame includes an underframe 9, a front frame 2 arranged at the front of the underframe 9, a rear frame 6 arranged at the rear of the underframe 9, and sides arranged at the left and right sides of the underframe 9. The bottom frame 9 is connected with the front frame 2, the rear frame 6, and the side frame 5 through the lower connecting seat 7, the supporting rod 4, and the upper connecting seat 3 to form a foldable frame structure. The rear frame 6 includes two crossed rear frame rods 61, which are divided into two parts: a short rear frame rod 611 and a long rear frame rod 612, which are connected in a stacked manner. The upper end of the short rear frame rod 611 is hinged to the upper connecting seat 3, and the lower end of the long rear frame rod 612 is hinged to the lower connecting seat 7. The front frame 2 and the rear frame 6 have the same structure and connection mode. The side frame 5 includes two side frame outer rods 51 and two side frame inner rods 52. One ends of the side frame outer rods 51 form a rotating structure by overlapping connection, and the other ends of the side frame outer rods 51 are hinged on the lower connecting seat 7. The side frame inner rods 52 are divided into two parts: inner long rods 521 and inner short rods 522 which are connected in a stacked manner, the two inner long rods 521 form a rotating structure by overlapping and connecting, and the two inner short rods 522 are hinged on the upper connecting seat 3; the underframe 9 includes a bottom beam 91, side rods 93 arranged at the front and rear sides of the bottom beam 91 in a cross shape, and hinges 92 for connecting the side rods 93. The bottom beam 91 includes a connecting member 911 located in the middle and beams 912 rotatably connected to both sides of the connecting member 911, and the free ends of the beams 912 are provided with fastening members 913. The fastening member 913 is positioned and installed at the overlapping joint of the two inner long rods 521 by bolt penetration, one end of the side rod 93 is provided with a rotatable connector 94, and the other end of the side rod 93 is rotatably connected to a blade 921 at one side of the hinge 92, and the connector 94 is rotatably connected to the lower connecting seat 7 (the rotation of the side rod relative to the connector and the rotation between the connector and the lower connecting seat form the upward folding and closing movement of the side rod). The blades 921 on both sides of the hinge 92 can be turned down and closed by rotation; wherein the pull rod assembly 1 includes a side pull rod 11 rotatably arranged on the front two connecting seats 7, a pull rod fixing block 12 connected to the free ends of the two side pull rods 11, and a middle pull rod 13 movably and adjustably inserted in the pull rod fixing block 12. The angle can be adjusted by the side pull rod, and after the position of the middle pull rod and the pull rod fixing block is adjusted, it is convenient to drag the foldable wagon by pulling the middle pull rod. The traveling wheel 8 is divided into a front wheel assembly and a rear wheel assembly. The front wheel assembly includes a front wheel 81, a bearing 83, and a bearing cover 82. The outer ring of the bearing 83 is tightly fitted in the mounting ring 71 of the lower connecting seat 7 on the front side and locked by the bearing cover 82. The circular axle 811 of the front wheel 81 passes through the bearing cover 82 and the bearing 83, and the circular axle 811 is tightly fitted with the inner ring of the bearing 83. The installation of the front wheel is realized by the integrated bearing, which is different from the conventional way of using balls to form plane rolling between the front wheel and the lower connecting seat, with better rolling performance and convenient assembly. The outer side of the mounting ring 71 is provided with an integrally formed buckle, and the bearing cover 82 is provided with a clamping groove corresponding to the buckle, so that the fastening connection is convenient for installation; the circular axle 811 extends upward into the supporting rod 4, and the free end of the circular axle 811 is provided with an annular groove 8111. The inside of the supporting rod 4 is provided with a pressing assembly 84 at a height position corresponding to the annular groove 8111. The pressing assembly 84 includes a button 841 and a spring 842, and the head of the button 841 is a pressing part 8411 extending out of the supporting rod 4 (the supporting rod 4 is provided with a notch corresponding to the pressing part 8411, as shown in FIG. 11). The spring 842 is connected to the tail of the button 841, and the main body of the button 841 is provided with a through hole, which is divided into a penetrating area 8412 and a clamping area 8413. The penetrating area 8412 is used for the circular axle 811 to penetrate, and the clamping area 8413 interacts with the annular groove 8111 to realize the position locking, so that the circular axle extends into the supporting rod. The secondary locking can be realized by the action of the pressing assembly (the axial movement of the round axle is limited but the free rotation of the round axle is not limited). In use, when the bearing loses its effectiveness due to damage, the circular axle can still rotate freely, thus ensuring the steering performance of the front wheel assembly. In addition, the front wheel assembly is connected with the supporting rod by the action of the pressing assembly, which is different from the existing way that the front wheel assembly is directly fixed on the lower connecting seat, and the overall connection strength is stronger. The rear wheel assembly includes a rear wheel 85, the square axle 851 of the rear wheel 85 penetrates into the supporting rod 4, the free end of the square axle 851 is provided with a square groove 8511, and a pressing assembly 84 is arranged in the supporting rod 4 at the height position corresponding to the square groove 8511. The locking of the square axle 851 is realized by the pressing assembly, and the connection between the rear wheel assembly and the supporting rod is also realized by the function of the pressing assembly. Different from the existing way that the rear wheel assembly is directly fixed on the lower connecting seat, the overall connection strength is higher.

The bottom frame comprises a bottom beam and side rods arranged at the front and rear sides of the bottom beam in a crossed way, which forms a stable triangular support structure, and the bottom beam has high structural strength. The bottom beam comprises a fastening member, which is connected with the overlapping joint of two inner long rods of the inner rods of the side frame by a bolt penetration, thus realizing the mutual connection between the bottom frame and the side frame and further increasing the overall strength of the foldable frame; The circular axle of the front wheel and the square axle of the rear wheel all extend into the supporting rod and are connected by pressing components, thus realizing the interconnection of the front wheel component, the rear wheel component and the supporting rod, and further strengthening the local connection strength at the lower connecting seat.

When in use, in order to facilitate the understanding of the present invention, depiction is made with reference to the attached drawings.

When folding is required, it only needs to lean the front frame, rear frame and side frame inward. The folded frame is shown in FIG. 15, and the outer side of the foldable frame can be used with cloth cover, as shown in FIG. 16.

The above is only the preferred embodiment of the present invention, and it is not intended to limit the present invention. For those skilled in the art, the present invention can be modified and varied. Any modification, equivalent substitution, improvement, etc. made within the spirit and principle of the present invention shall be included in the scope of protection of the present invention.

What is claimed is:

1. A foldable wagon, comprising:
   a foldable frame and at least one traveling wheel installed at the bottom of the foldable frame, wherein the foldable frame comprises an underframe, a front frame arranged at the front of the underframe, a rear frame arranged at the rear of the underframe, a side frame arranged at the side of the underframe, and at least one travelling wheel arranged at the left side and at the right side of the underframe;
   the underframe is connected with the front frame, the rear frame and the side frame through at least two of each: lower connecting seat, supporting rod and upper connecting seat to form a foldable frame structure,
   wherein the underframe comprises:
   a first pair of side rods aligned in overlapping and crossing manner, each side rod of the first pair of side rods comprises a rotatable connector at one end, and the other end is a first free end, a second pair of side rods aligned in overlapping and crossing manner, each side rod of the second pair of side rods comprises a rotatable connector at one end, and other end is a second free end, a pair of hinges coupled to the first free ends and the second free ends, to connect the first pair of side rods with the second pair of side rods, wherein each rotatable connector of the first and second pairs of side rods is rotatably connected to the lower connecting seat, and wherein each of the first and second free ends of each of the pairs of side rods is rotatably connected to a blade at one side of each of the pair of hinges, and the blades on both sides of each of the pair of hinges are turned down and closed by rotation, and wherein the first pair of side rods and the second pair of side rods are folded horizontally via the respective hinges of the pair of hinges.

2. The foldable wagon according to claim 1, wherein a pull rod assembly is arranged at the front of the foldable frame, and the pull rod assembly comprises side pull rods rotatably arranged on the two lower connecting seats at the front side, a pull rod fixing block connected to the free ends of the two side pull rods, and a middle pull rod movably and adjustably penetrates through the pull rod fixing block.

3. The foldable wagon according to claim 1, wherein the rear frame comprises two crossed rear frame rods, each of the two crossed rear frame rods are divided into two parts: a short rear frame rod and a long rear frame rod which are connected in a stacked manner; an upper end of each short rear frame rod is hinged on an upper connecting seat, a lower end of each long rear frame rod is hinged on a lower connecting seat, and wherein the front frame comprises two crossed front frame rods, each of the two crossed front frame rods are divided into two parts: a short front frame rod and a long front frame rod which are connected in a stacked manner; an upper end of each short front frame rod is hinged on an upper connecting seat, a lower end of each long front frame rod is hinged on a lower connecting seat.

4. The foldable wagon according to claim 3, wherein the side frame comprises two side frame outer rods and two side frame inner rods; one ends of the two side frame outer rods form a rotating structure by overlapping and connecting, and the other ends of the two side frame outer rods are each hinged on a lower connecting seat; each side frame inner rod is divided into two parts: an inner long rod and an inner short rod which are connected in a stacked manner; the two inner long rods form a rotating structure by overlapping and connecting, and the two inner short rods are hinged on an upper connecting seat of the front frame and the rear frame, respectively.

5. The foldable wagon according to claim 1, wherein the at least one traveling wheel is divided into a front wheel assembly and a rear wheel assembly, wherein the front wheel assembly comprises a front wheel, a bearing and a bearing cover, and an outer ring of the bearing is tightly fitted with a mounting ring of a lower connecting seat on the front side and locked by the bearing cover; a circular axle of the front wheel passes through the bearing cover and the bearing, and the circular axle is tightly fitted with an inner ring of the bearing, and an outer side of the mounting ring is provided with an integrally formed buckle, and the bearing cover is provided with a clamping groove corresponding to the buckle.

6. The foldable wagon according to claim 5, wherein the circular axle extends upwards to the inside of a supporting rod, and a free end of the circular axle is provided with an annular groove, and the supporting rod is internally provided with a pressing assembly at a height position corresponding to the annular groove; the pressing assembly comprises a button and a spring, the head of the button is a pressing part extending out of the supporting rod, the spring is connected to the tail of the button; a through hole is processed on a main body of the button, the through hole is divided into a penetrating area and a locking area, wherein the penetrating area is used for the circular axle to penetrate, and the locking area interacts with the annular groove to realize position locking.

7. The foldable wagon according to claim 6, wherein the rear wheel assembly comprises a rear wheel, a square axle of the rear wheel penetrates into the inside of a supporting rod, and a free end of the square axle is provided with a square groove, and the inside of the supporting rod is connected with the square groove, a pressing assembly is arranged in the supporting rod at the height position corresponding to the square groove, and the square axle is locked by the pressing assembly.

8. The foldable wagon according to claim 1, wherein a cloth cover is arranged outside the foldable frame, and the cloth cover is detachably connected with the foldable frame through a hook and loop.

9. A foldable wagon, comprising:
a foldable frame, and at least one traveling wheel installed at the bottom of the foldable frame, wherein the foldable frame comprises an underframe, a front frame arranged at the front of the underframe, a rear frame arranged at the rear of the underframe, a side frame arranged at the side of the underframe, and at least one travelling wheel arranged at the left side and at the right side of the underframe;

the underframe is connected with the front frame, the rear frame and the side frame through at least two of each: lower connecting seat, supporting rod and upper connecting seat to form a foldable frame structure;

the side frame comprises two side frame outer rods and two side frame inner rods, one ends of the two side frame outer rods form a rotating structure by overlapping and connecting, the other ends of the two side frame outer rods are each hinged on a lower connecting seat, each side frame inner rod is divided into two parts: an inner long rod and an inner short rod which are connected in a stacked manner; the two inner long rods form a rotating structure by overlapping and connecting, and the two inner short rods are hinged on an upper connecting seat of the front frame and the rear frame, respectively, wherein the underframe comprises a pair of side rods, hinges and connectors, wherein one end of each side rod of the pair of side rods is provided with a rotatable connector, and each rotatable connector is rotatably connected to a lower connecting seat; the other end of each side rod of the pair of side rods is rotatably connected to a blade at one side of each of the hinges, and the blades on both sides of the hinges are turned down and closed by rotation;

the underframe further comprises a bottom beam located below the hinges, the bottom beam comprises a connecting member located in the middle and beams rotatably connected to both sides of the connecting member; a free end of the beam is provided with a fastening member, and the fastening member is positioned and installed at the overlapping joint of the two inner long rods in a bolt penetrating manner.

10. A foldable wagon, comprising:
a foldable frame and at least one traveling wheel installed at the bottom of the foldable frame, wherein the foldable frame comprises an underframe, a front frame arranged at the front of the underframe, a rear frame arranged at the rear of the underframe, and side frames on the left and right sides of the bottom frame;
the underframe is connected with the front frame, the rear frame and the side frames through at least two of each: lower connecting seat, supporting rod and upper connecting seat to form a foldable frame structure,
wherein the at least one travelling wheel is divided into a front wheel assembly and a rear wheel assembly, and the front wheel assembly comprises a front wheel, a bearing and a bearing cover, and an outer ring of the bearing is tightly fitted with a mounting ring of a lower connecting seat on the front side; a circular axle of the front wheel is tightly fitted with the inner ring of the bearing, and the circular axle extends upwards to the inside a respective supporting rod, and a free end of the circular axle is provided with an annular groove, a pressing assembly is arranged in the supporting rod at the height position corresponding to the annular groove; the pressing assembly comprises a button and a spring, the head of the button is a pressing part extending out of the supporting rod, the spring is connected to the tail of the button, the button is matched with the annular groove and the circular axle is clamped or released by pressing movement,
wherein the side frame comprises two side frame outer rods and two side frame inner rods, one ends of the two side frame outer rods form a rotating structure by overlapping and connecting, the other ends of the two side frame outer rods are each hinged on a lower connecting seat, each side frame inner rod is divided into two parts: an inner long rod and an inner short rod which are connected in a stacked manner; the two inner long rods form a rotating structure by overlapping and connecting, and the two inner short rods are hinged on an upper connecting seat of the front frame and the rear frame, respectively,
wherein the underframe comprises a pair of side rods, hinges and connectors, wherein one end of each side rod of the pair of side rods is provided with a rotatable connector, and each rotatable connector is rotatably connected to a lower connecting seat; the other end of each side rod of the pair of side rods is rotatably connected to a blade at one side of each of the hinges, and the blades on both sides of the hinges are turned down and closed by rotation;
the underframe further comprises a bottom beam located below the hinges, the bottom beam comprises a connecting member located in the middle and beams rotatably connected to both sides of the connecting member; a free end of the beam is provided with a fastening member, and the fastening member is positioned and installed at the overlapping joint of the two inner long rods in a bolt penetrating manner.

11. The foldable wagon according to claim 9, wherein a pull rod assembly is arranged at the front of the foldable frame, and the pull rod assembly comprises side pull rods rotatably arranged on the two lower connecting seats at the front side, a pull rod fixing block connected to the free ends of the two side pull rods, and a middle pull rod movably and adjustably penetrates through the pull rod fixing block.

12. The foldable wagon according to claim 9, wherein the rear frame comprises two crossed rear frame rods, each of the two crossed rear frame rods are divided into two parts: a short rear frame rod and a long rear frame rod which are connected in a stacked manner; an upper end of each short rear frame rod is hinged on an upper connecting seat, a lower end of each long rear frame rod is hinged on a lower connecting seat, and wherein the front frame comprises two crossed front frame rods, each of the two crossed front frame rods are divided into two parts: a short front frame rod and a long front frame rod which are connected in a stacked manner; an upper end of each short front frame rod is hinged on an upper connecting seat, a lower end of each long front frame rod is hinged on a lower connecting seat.

13. The foldable wagon according to claim 9, wherein the at least one traveling wheel is divided into a front wheel assembly and a rear wheel assembly, wherein the front wheel assembly comprises a front wheel, a bearing and a bearing cover, and an outer ring of the bearing is tightly fitted with a mounting ring of a lower connecting seat on the front side and locked by the bearing cover; a circular axle of the front wheel passes through the bearing cover and the bearing, and the circular axle is tightly fitted with an inner ring of the bearing, and an outer side of the mounting ring is provided with an integrally formed buckle, and the bearing cover is provided with a clamping groove corresponding to the buckle.

14. The foldable wagon according to claim 13, wherein the circular axle extends upwards to the inside of a supporting rod, and a free end of the circular axle is provided with an annular groove, and the supporting rod is internally provided with a pressing assembly at a height position corresponding to the annular groove; the pressing assembly comprises a button and a spring, the head of the button is a pressing part extending out of the supporting rod, the spring is connected to the tail of the button; a through hole is processed on a main body of the button, the through hole is divided into a penetrating area and a locking area, wherein the penetrating area is used for the circular axle to penetrate, and the locking area interacts with the annular groove to realize position locking.

15. The foldable wagon according to claim 14, wherein the rear wheel assembly comprises a rear wheel, a square axle of the rear wheel penetrates into the inside of a supporting rod, and a free end of the square axle is provided with a square groove, and the inside of the supporting rod is connected with the square groove, a pressing assembly is arranged in the supporting rod at the height position corresponding to the square groove, and the square axle is locked by the pressing assembly.

16. The foldable wagon according to claim 9, wherein a cloth cover is arranged outside the foldable frame, and the cloth cover is detachably connected with the foldable frame through a hook and loop.

\* \* \* \* \*